United States Patent
Vaccaro et al.

(10) Patent No.: US 11,536,398 B2
(45) Date of Patent: Dec. 27, 2022

(54) HANGER FOR MOUNTING MULTIPLE CABLES

(71) Applicant: CommScope Technologies LLC, Hickory, NC (US)

(72) Inventors: Ronald A. Vaccaro, Taylorsville, NC (US); Aviral Joshi, Chicago, IL (US); Taig S. Rajpal, Chicago, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/082,656

(22) Filed: Oct. 28, 2020

(65) Prior Publication Data

US 2021/0041042 A1 Feb. 11, 2021

Related U.S. Application Data

(63) Continuation of application No. 15/819,647, filed on Nov. 21, 2017, now Pat. No. 10,823,312.

(Continued)

(51) Int. Cl.
*F16L 3/22* (2006.01)
*F16L 3/223* (2006.01)
(Continued)

(52) U.S. Cl.
CPC ............ *F16L 3/223* (2013.01); *F16L 3/133* (2013.01); *H02G 3/32* (2013.01); *F16L 3/08* (2013.01); *F16L 3/22* (2013.01)

(58) Field of Classification Search
CPC ... F16L 3/133; F16L 3/223; F16L 3/08; F16L 3/221; F16L 3/22; H02G 3/32; H02G 3/263; H02G 1/00

(Continued)

(56) References Cited

U.S. PATENT DOCUMENTS 582,086 A * 5/1897 Poole et al. ............ B62H 3/00
                                                           211/22
924,090 A   6/1909 Moore
(Continued)

FOREIGN PATENT DOCUMENTS

BR   102014007903 A2   12/2015
CN        1520498         8/2004
(Continued)

OTHER PUBLICATIONS

"Examination Report corresponding to European Application No. 17870144.7 dated Apr. 22, 2021".

(Continued)

*Primary Examiner* — Nkeisha Smith
(74) *Attorney, Agent, or Firm* — Myers Bigel, P.A.

(57) ABSTRACT

A cable hanger for securing cables to a supporting structure includes: a base panel having opposed ends; a pair of arms attached to a respective end of the base panel and having a free end; a pair of locking projections, each of the locking projections attached to a respective free end of the arms; a pair of gripping members, each gripping member attached with a respective arm or to the base panel, wherein the arms and locking projections are spread apart to enable insertion of a first cable between the arms, wherein the gripping members engage and grip the first cable, and wherein the locking projections are inserted into the aperture of the supporting structure; and at least one finger attached to and extending from one of the arms or the base panel, the finger configured to deflect and grasp a second cable against the arm or base panel.

10 Claims, 7 Drawing Sheets

Related U.S. Application Data (60) Provisional application No. 62/447,947, filed on Jan. 19, 2017, provisional application No. 62/427,975, filed on Nov. 30, 2016.

(51) Int. Cl.
*H02G 3/32* (2006.01)
*F16L 3/133* (2006.01)
*F16L 3/08* (2006.01)

(58) Field of Classification Search
USPC ...... 248/68.1, 74.2, 74.3, 74.4, 71, 73, 74.1, 248/49
See application file for complete search history.

(56) References Cited

U.S. PATENT DOCUMENTS

| | | | |
|---|---|---|---|
| 1,376,284 | A | 4/1921 | Kohn |
| 1,452,497 | A | 4/1923 | Fischer |
| 1,982,501 | A | 11/1934 | Douglas |
| 2,032,413 | A | 3/1936 | Hall |
| 2,179,406 | A * | 11/1939 | Fitzpatrick .............. F16L 3/221 248/68.1 |
| 2,375,513 | A | 8/1945 | Bach |
| 2,447,025 | A | 8/1948 | Newman |
| 2,453,980 | A | 11/1948 | Hartmann |
| 2,470,814 | A * | 5/1949 | Hain ...................... F16L 3/221 248/68.1 |
| 2,495,848 | A | 1/1950 | Kiesel |
| 2,560,845 | A | 7/1951 | Carpenter et al. |
| 2,605,865 | A | 8/1952 | Liptay |
| 2,723,431 | A | 11/1955 | Di Renzo |
| 2,746,110 | A | 5/1956 | Bedord, Jr. |
| 2,990,150 | A | 6/1961 | Weigel et al. |
| 3,042,352 | A | 7/1962 | Stamper |
| 3,050,578 | A | 8/1962 | Huebner |
| 3,163,712 | A | 12/1964 | Cochran |
| 3,179,969 | A | 4/1965 | Glynn |
| 3,189,961 | A | 6/1965 | Heller |
| 3,228,640 | A * | 1/1966 | Wolsh ...................... F16L 3/24 248/72 |
| 3,404,858 | A | 10/1968 | Levy |
| 3,430,904 | A | 3/1969 | Soltysik |
| 3,485,467 | A | 12/1969 | Fuchs et al. |
| 3,501,117 | A | 3/1970 | Soltysik |
| 3,536,281 | A | 10/1970 | Meehan et al. |
| 3,599,915 | A | 8/1971 | Soltysik |
| 3,916,089 | A | 10/1975 | Sloan |
| 3,981,048 | A | 9/1976 | Moody et al. |
| 4,148,113 | A | 4/1979 | Dvorachek |
| 4,244,542 | A | 1/1981 | Mathews |
| 4,244,544 | A | 1/1981 | Kornat |
| 4,295,618 | A | 10/1981 | Morota et al. |
| 4,306,697 | A * | 12/1981 | Mathews ................. F16L 3/222 248/68.1 |
| 4,344,480 | A | 8/1982 | Boyer et al. |
| 4,356,987 | A | 11/1982 | Schmid |
| 4,441,680 | A | 4/1984 | Rivkin et al. |
| 4,669,156 | A | 6/1987 | Guido et al. |
| 4,795,856 | A | 1/1989 | Farmer |
| 4,813,639 | A * | 3/1989 | Midkiff ................. H01Q 1/1242 248/68.1 |
| D305,099 | S | 12/1989 | Naruse |
| 4,958,792 | A * | 9/1990 | Rinderer .................. F16L 3/13 24/457 |
| 5,016,843 | A * | 5/1991 | Ward ....................... F16L 3/04 174/4 R |
| 5,035,383 | A | 7/1991 | Rainville |
| 5,085,384 | A | 2/1992 | Kasubke |
| 5,149,027 | A | 9/1992 | Weber |
| 5,188,318 | A | 2/1993 | Newcomer et al. |
| 5,320,312 | A * | 6/1994 | Hoenninger ............ F16L 3/227 211/107 |
| 5,393,021 | A | 2/1995 | Nelson |
| D357,802 | S | 5/1995 | Todd et al. |
| 5,587,555 | A | 12/1996 | Rinderer |
| 5,677,513 | A | 10/1997 | Ito et al. |
| 5,762,299 | A * | 6/1998 | Motsch .................... F16L 3/13 248/71 |
| 5,833,188 | A | 11/1998 | Studdiford et al. |
| 5,876,000 | A | 3/1999 | Ismert |
| 5,878,465 | A | 3/1999 | Jenner |
| 5,921,520 | A * | 7/1999 | Wisniewski .............. F16L 3/12 248/316.1 |
| 5,971,329 | A | 10/1999 | Hickey |
| 6,257,530 | B1 | 7/2001 | Tsai |
| 6,317,933 | B1 | 11/2001 | Suenaga |
| 6,323,430 | B1 | 11/2001 | Finona |
| 6,354,543 | B1 | 3/2002 | Paske |
| 6,580,867 | B2 | 6/2003 | Galaj et al. |
| 6,899,305 | B2 * | 5/2005 | Korczak ................... F16L 3/12 248/68.1 |
| 6,935,001 | B2 | 8/2005 | Barriuso et al. |
| 7,131,792 | B2 | 11/2006 | Doverspike |
| 7,384,018 | B2 | 6/2008 | Moretto |
| 7,500,644 | B2 | 3/2009 | Naudet et al. |
| 7,518,058 | B1 | 4/2009 | Hagbrandt et al. |
| 7,533,854 | B2 * | 5/2009 | Aube ................. A61M 5/1417 248/218.4 |
| D597,403 | S | 8/2009 | Ho et al. |
| 7,651,056 | B2 | 1/2010 | Tjerrild |
| 7,997,546 | B1 | 8/2011 | Andersen et al. |
| 8,011,621 | B2 * | 9/2011 | Korczak ................. F16L 3/127 248/68.1 |
| 8,020,259 | B2 | 9/2011 | Ho et al. |
| 8,020,811 | B2 | 9/2011 | Nelson |
| 8,191,836 | B2 | 6/2012 | Korczak |
| 8,353,485 | B2 * | 1/2013 | Hjerpe .................... F16L 3/222 248/68.1 |
| 8,439,316 | B2 * | 5/2013 | Feige ....................... F16L 3/10 248/71 |
| 8,540,191 | B2 * | 9/2013 | Sabadie .................. B64C 1/406 244/131 |
| 8,541,682 | B2 | 9/2013 | Mazelle et al. |
| 8,776,328 | B2 | 7/2014 | Kodi |
| 8,785,779 | B1 | 7/2014 | Jones et al. |
| 8,879,881 | B2 | 11/2014 | Cote et al. |
| 9,127,789 | B2 | 9/2015 | Caspari et al. |
| 9,206,927 | B2 | 12/2015 | Carter et al. |
| 9,759,880 | B2 | 9/2017 | Chamberlain et al. |
| 9,841,123 | B1 | 12/2017 | White |
| 9,853,434 | B2 * | 12/2017 | Vaccaro .................... F16B 1/00 |
| 9,866,004 | B2 * | 1/2018 | Vaccaro .................... E01F 9/65 |
| 9,879,803 | B2 * | 1/2018 | Leng ...................... H02G 3/32 |
| 9,903,510 | B2 | 2/2018 | Joshi et al. |
| 9,995,414 | B2 | 6/2018 | Joshi et al. |
| 10,215,308 | B2 | 2/2019 | Bartos |
| 10,415,723 | B2 * | 9/2019 | Vaccaro .................... F16L 3/00 |
| 10,422,446 | B2 * | 9/2019 | Joshi ...................... F16L 3/221 |
| 10,634,265 | B2 * | 4/2020 | Joshi ...................... F16L 3/13 |
| 10,637,226 | B2 * | 4/2020 | Bell ....................... F16L 3/222 |
| 10,663,088 | B2 * | 5/2020 | Vaccaro ................... H02G 3/32 |
| 10,760,714 | B2 | 9/2020 | Rajpal et al. |
| 10,823,312 | B2 | 11/2020 | Vaccaro et al. |
| 10,837,577 | B2 * | 11/2020 | Arbuckle ................ F16L 3/127 |
| 10,927,980 | B2 * | 2/2021 | Varale .................... F16L 3/1075 |
| 10,935,105 | B2 | 3/2021 | Bell et al. |
| 2002/0005463 | A1 | 1/2002 | Paske et al. |
| 2002/0012582 | A1 | 1/2002 | Kirkegaard et al. |
| 2003/0173470 | A1 | 9/2003 | Geiger |
| 2004/0113027 | A1 | 6/2004 | Nakanishi |
| 2004/0251386 | A1 | 12/2004 | Mizukoshi et al. |
| 2005/0109887 | A1 * | 5/2005 | Catapano ................ F16L 3/222 248/68.1 |
| 2005/0109890 | A1 | 5/2005 | Korczak et al. |
| 2005/0253025 | A1 | 11/2005 | Benoit et al. |
| 2006/0108480 | A1 | 5/2006 | Goodwin et al. |
| 2006/0237217 | A1 | 10/2006 | Glew |
| 2006/0249633 | A1 * | 11/2006 | Korczak ................... F16L 3/24 248/62 |
| 2007/0007397 | A1 | 1/2007 | Nelson |
| 2007/0120023 | A1 | 5/2007 | Martinez et al. |

(56) References Cited

U.S. PATENT DOCUMENTS

| | | | |
|---|---|---|---|
| 2007/0246616 A1 | 10/2007 | Budagher | |
| 2008/0093510 A1 | 4/2008 | Oh et al. | |
| 2008/0115448 A1 | 5/2008 | Kodi | |
| 2009/0230256 A1* | 9/2009 | Widlacki | F16L 3/222 248/68.1 |
| 2009/0242715 A1 | 10/2009 | Kosidlo et al. | |
| 2009/0294602 A1* | 12/2009 | Korczak | H02G 3/30 248/74.2 |
| 2010/0084520 A1 | 4/2010 | Ohno | |
| 2011/0107719 A1 | 5/2011 | Kodi | |
| 2011/0226913 A1 | 9/2011 | Feige | |
| 2011/0260025 A1 | 10/2011 | Aoshima et al. | |
| 2011/0283515 A1 | 11/2011 | Korczak | |
| 2012/0045608 A1 | 2/2012 | Huchet et al. | |
| 2012/0085577 A1 | 4/2012 | Eshima et al. | |
| 2012/0305724 A1 | 12/2012 | Diez Herrera et al. | |
| 2013/0104494 A1 | 5/2013 | Evangelista et al. | |
| 2013/0146720 A1 | 6/2013 | Meyers et al. | |
| 2013/0146721 A1* | 6/2013 | White | H02G 3/32 248/68.1 |
| 2013/0175407 A1* | 7/2013 | Williams | F16L 3/223 248/68.1 |
| 2013/0187012 A1 | 7/2013 | Blakeley et al. | |
| 2013/0320157 A1 | 12/2013 | Carter et al. | |
| 2013/0320182 A1 | 12/2013 | Kataoka et al. | |
| 2014/0054425 A1 | 2/2014 | Jang | |
| 2014/0259620 A1* | 9/2014 | Hicks | F16L 3/223 29/525.01 |
| 2014/0260083 A1 | 9/2014 | Zhang et al. | |
| 2014/0306071 A1* | 10/2014 | Stechmann | H02G 3/32 248/74.1 |
| 2015/0136473 A1 | 5/2015 | Jafari et al. | |
| 2015/0155669 A1 | 6/2015 | Chamberlain et al. | |
| 2015/0159781 A1 | 6/2015 | Wilson et al. | |
| 2016/0281881 A1 | 9/2016 | Vaccaro et al. | |
| 2016/0281883 A1 | 9/2016 | Vaccaro et al. | |
| 2016/0327187 A1 | 11/2016 | Brown | |
| 2016/0341340 A1 | 11/2016 | Gomes Fernandes | |
| 2017/0122460 A1 | 5/2017 | Joshi et al. | |
| 2018/0045336 A1 | 2/2018 | Vaccaro | |
| 2018/0172183 A1* | 6/2018 | Joshi | H02G 1/00 |
| 2018/0202580 A1 | 7/2018 | Joshi et al. | |
| 2020/0041039 A1 | 2/2020 | Varale | |
| 2021/0108742 A1* | 4/2021 | Varale | F16L 3/105 |
| 2021/0151971 A1 | 5/2021 | Vaccaro | |

FOREIGN PATENT DOCUMENTS

| | | |
|---|---|---|
| CN | 101589513 | 11/2009 |
| DE | 845808.1 C | 8/1952 |
| DE | 2401187 | 1/1975 |
| DE | 2903306 A1 | 8/1979 |
| DE | 2921891 A1 | 12/1980 |
| DE | 3823578 A1 | 2/1989 |
| DE | 202015007620.3 U1 | 12/2015 |
| DE | 102017106520 A1 | 9/2018 |
| EP | 3539191 A2 | 9/2019 |
| FR | 2145985 | 2/1973 |
| FR | 2176184 A5 | 10/1973 |
| GB | 1599416 A | 9/1981 |
| GB | 2203433 A | 10/1988 |
| JP | 5775283 | 5/1982 |
| JP | 61200974 | 12/1986 |
| JP | 886386 | 4/1996 |
| JP | 9144719 | 6/1997 |
| JP | 10019168 | 1/1998 |
| JP | 11223281 | 8/1999 |
| JP | 2002130539 | 5/2002 |
| JP | 3653346 B2 | 3/2005 |
| JP | 2012002323 | 1/2012 |
| JP | 2012222986 | 11/2012 |
| KR | 101399938 | 6/2014 |
| WO | 2002095956 | 11/2002 |
| WO | 2008082595 | 7/2008 |
| WO | 2010143222 | 12/2010 |

OTHER PUBLICATIONS

"Office Action corresponding to Chinese Application No. 201780075195.8 dated Mar. 29, 2021".

"International Preliminary Report on Patentability corresponding to International Application No. PCT/US2019/042952 dated Feb. 11, 2021".

"English Translation of Second Office Action corresponding to Chinese Patent Application No. 201780067453.8 dated Jul. 20, 2020, 18 pages".

"Extended European Search Report corresponding to European Application No. 17870023.3 dated Jun. 3, 2020".

"Extended European Search Report, corresponding to European Application No. 17870144.7 dated Jun. 3, 2020".

"Extended European Search Report corresponding to European Application No. 17875334.9 dated Jun. 2, 2020".

"Extended European Search Report corresponding to European Patent Application No. 17892843.8 dated Oct. 1, 2020, 8 pages".

"International Preliminary Report on Patentability corresponding to International Application No. PCT/US2017/056019 dated May 23, 2019".

"International Preliminary Report on Patentability corresponding to International Application No. PCT/US2017/060115 dated May 23, 2019".

"International Preliminary Report on Patentability corresponding to International Application No. PCT/US2017/062730 dated Jun. 13, 2019".

"International Preliminary Report on Patentability corresponding to International Application No. PCT/US2017/062743 dated Jun. 27, 2019".

"International Preliminary Report on Patentability corresponding to International Application No. PCT/US2017/068510 dated Aug. 1, 2019".

"Notification of Transmittal of the International Search Report and the Written Opinion of the International Searching Authority, or the Declaration corresponding to International Application No. PCT/US2017/056109 dated Jan. 24, 2018".

"Notification of Transmittal of the International Search Report and the Written Opinion of the International Searching Authority, or the Declaration corresponding to International Application No. PCT/US2017/060115 dated Feb. 14, 2018".

"Notification of Transmittal of the International Search Report and the Written Opinion of the International Searching Authority, or the Declaration corresponding to International Application No. PCT/US2017/062730 dated Mar. 13, 2018".

"Notification of Transmittal of the International Search Report and the Written Opinion of the International Searching Authority, or the Declaration corresponding to International Application No. PCT/US2017/062743 dated Mar. 12, 2018".

"Notification of Transmittal of the International Search Report and the Written Opinion of the International Searching Authority, or the Declaration corresponding to International Application No. PCT/US2017/065801 dated Apr. 13, 2018".

"Notification of Transmittal of the International Search Report and the Written Opinion of the International Searching Authority, or the Declaration corresponding to International Application No. PCT/US2017/068510 dated Apr. 17, 2018".

"Notification of Transmittal of the International Search Report and the Written Opinion of the International Searching Authority, or the Declaration corresponding to International Application No. PCT/US2019/042952 dated Nov. 8, 2019".

"Office Action corresponding to Chinese Application No. 201780065736.9 dated Mar. 2, 2020".

"Office Action corresponding to Chinese Application No. 201780067453.8 dated Jan. 22, 2020".

"Office Action corresponding to Chinese Application No. 201780067453.8 dated Oct. 22, 2020".

(56) References Cited

OTHER PUBLICATIONS

"Office Action corresponding to Chinese Application No. 201780067503.2 dated Feb. 3, 2020".
"Office Action corresponding to Chinese Application No. 201780075195.8 dated Jan. 21, 2020".
"Office Action corresponding to Chinese Application No. 201780075195.8 dated Nov. 3, 2020".
"Office Action corresponding to Chinese Application No. 201780075198.5 dated Jan. 21, 2020".
"Examination Report corresponding to European Application No. 17870023.3 dated May 31, 2021".
"Examination Report corresponding to European Application No. 17875334.9 dated Oct. 14, 2021".

* cited by examiner

HANGER FOR MOUNTING MULTIPLE CABLES

RELATED APPLICATIONS

The present application is a continuation of and claims priority to U.S. patent application Ser. No. 15/819,647, filed Nov. 21, 2017, which claims priority from and the benefit of U.S. Provisional Patent Application Nos. 62/427,975, filed Nov. 30, 2016, and 62/447,947, filed Jan. 19, 2017, the disclosures of which are hereby incorporated herein in their entireties.

FIELD OF THE INVENTION

The present invention relates generally to devices for supporting cables and, in particular, to hangers for securing cables to support structures.

BACKGROUND OF THE INVENTION

Cable hangers are commonly used to secure cables to structural members of antenna towers and or along tunnel walls. Generally, each cable is attached to a structural member by cable hangers mounted at periodically-spaced attachment points.

Antenna towers and or tunnels may be crowded due to the large numbers of cables required for signal-carrying. Over time, as systems are added, upgraded and/or expanded, installation of additional cables may be required. To conserve space, it may be desirable for each set of cable hangers to secure more than a single cable. Certain cable hangers have been constructed to secure multiple cables; other cable hangers have a stackable construction that permits multiple cable hangers to be interlocked extending outwardly from each mounting point/structural member. Stacked and multiple-cable-type cable hangers significantly increase the number of cables mountable to a single attachment point.

Figure 1:
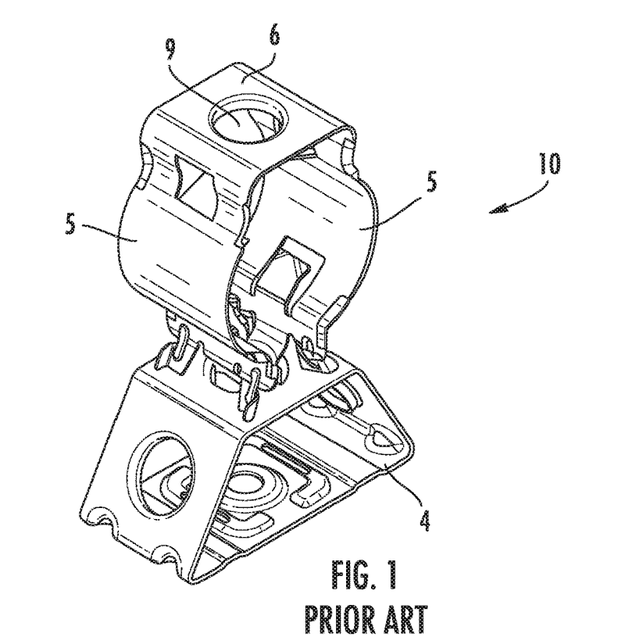
FIG. 1 is a perspective view of a prior art cable hanger.
Figure 2:
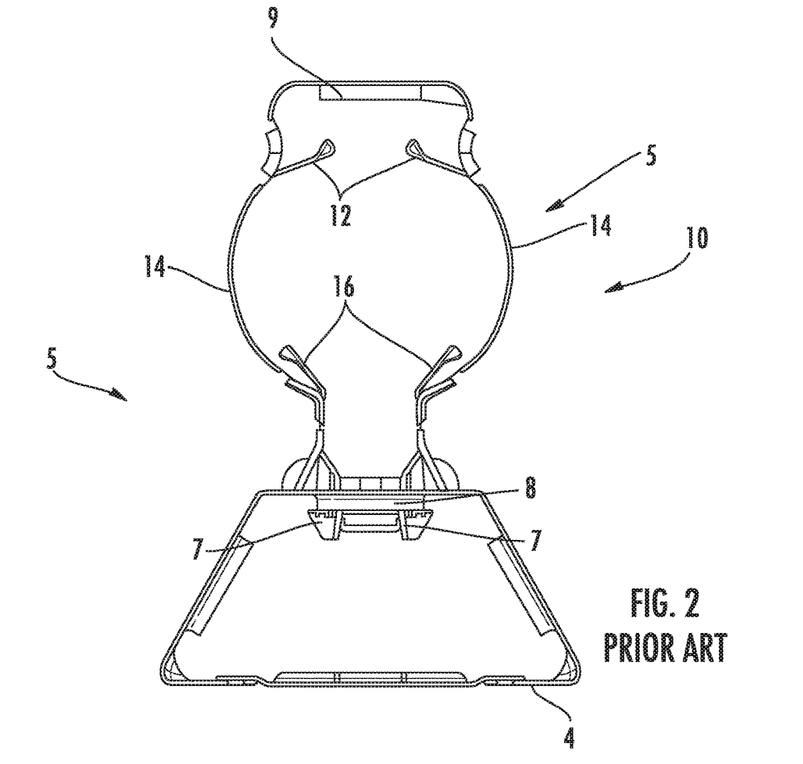
FIG. 2 is a top view of the prior art cable hanger of FIG. 1.

One popular stackable cable hanger is discussed in U.S. Pat. No. 8,191,836 to Korczak, the disclosure of which is hereby incorporated herein by reference in its entirety. One such cable hanger, designated broadly at 10, is shown in FIGS. 1 and 2. The hanger 10 includes curved arms 5 that extend from a flat base 6. Locking projections 7 extend from the free ends of the arms 5. As can be seen in FIGS. 1 and 2, the locking projections 7 are inserted into a reinforced hole 8 in a tower structure 4 to mount the hanger 10 thereon. The base 6 of the hanger 10 includes a reinforced hole 9 that can receive the projections of another hanger 10 to mount a second cable.

As can be best seen in FIG. 2, the arms 5 include arcuate sections 14 that together generally define a circle within which a cable can reside. Two cantilevered tabs 12 extend radially inwardly and toward the base 6 at one end of the arcuate sections 14, and two cantilevered tabs 16 extend radially inwardly and toward the base 6 from the opposite ends of the arcuate sections 14. The cantilevered tabs 12, 16 are deployed to deflect radially outwardly when the hanger 10 receives a cable for mounting; this deflection generates a radially inward force from each tab 12, 16 that grips the jacket of the cable.

Hangers can be "stacked" onto each other by inserting the locking projections 7 of one hanger into the large hole 9 of the next hanger. One variety of cable hanger of this type is the SNAP-STAK® hanger, available from CommScope, Inc. (Joliet, Ill.).

The SNAP-STAK® hanger is offered in multiple sizes that correspond to the outer diameters of different cables. This arrangement has been suitable for use with RF coaxial cables, which tend to be manufactured in only a few different outer diameters; however, the arrangement has been less desirable for fiber optic cables, which tend to be manufactured in a much greater variety of diameters. Moreover, fiber optic cables tend to be much heavier than coaxial cables (sometimes as much as three times heavier per unit foot), which induces greater load and stress on the hangers.

Figure 3:
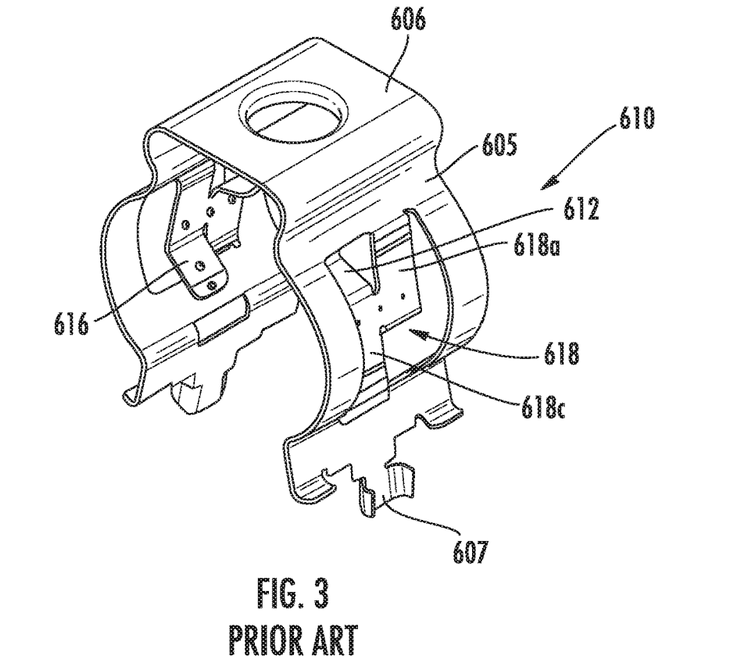
FIG. 3 is a perspective view of another prior art cable hanger.
Figure 4:
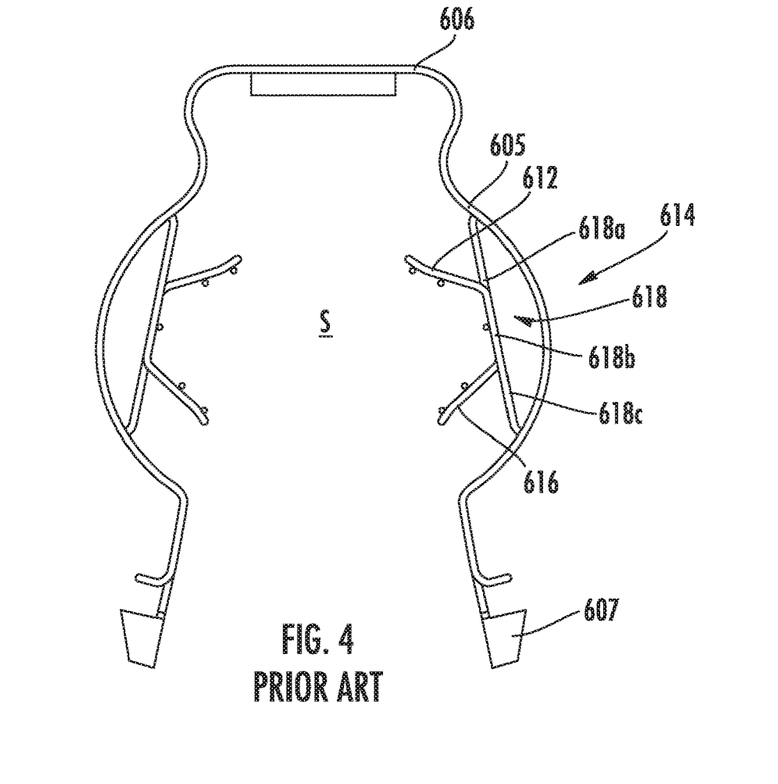
FIG. 4 is a top view of the cable hanger of FIG. 3.

Multiple approaches to addressing this issue are offered in co-assigned and co-pending U.S. Patent Publication No. 2016/0281881 to Vaccaro, the disclosure of which is hereby incorporated herein by reference in full. One cable hanger discussed in this publication is shown in FIGS. 3 and 4 and designated broadly at 610 therein. The cable hanger 610 is somewhat similar to the cable hanger 10, inasmuch as it has a base 606, curved arms 605 and locking projections 607 that resemble those of the hanger 10 discussed above. However, the cable hanger 610 also has flex members 618 that define chords across the arcuate sections 614 of the arms 605. As can be seen in FIG. 4, cantilevered gripping members 612, 616 extend from the flex members 618 and into the cable-gripping space S within the arms 605. It can also be seen in FIG. 3 that the flex members 618 are tripartite, with two vertically offset horizontal runs 618a, 618c merging with the arcuate sections 614 of the arms 605 and a vertical run 618b extending between the horizontal runs 618a, 618c. The gripping members 612, 616 extend from opposite sides of the vertical run 618b and are vertically offset from each other.

In use, the cable hanger 610 is employed in the same manner as the cable hanger 10; a cable is inserted into the space S between the arms 605, which are then closed around the cable as the locking projections 607 are inserted into a mounting hole. The cantilevered gripping members 612, 616 can help to grip and to center the cable within the space S. The presence of the flex members 618, which are fixed end beams rather than cantilevered tabs, can provide additional gripping force beyond that of the cable hanger 10.

In view of the foregoing, it may be desirable to provide additional configurations of cable hangers to enable a technician to adapt to different cable sizes and mounting conditions.

SUMMARY

As a first aspect, embodiments of the invention are directed to a cable hanger for securing one or more cables to a supporting structure having an aperture. The cable hanger comprises: a base panel having opposed ends; a pair of arms, each of the arms attached to a respective end of the base panel and having a free end; a pair of locking projections, each of the locking projections attached to a respective free end of the arms; and a pair of gripping members, each gripping member attached with a respective arm or to the base panel. The arms and locking projections are configured to spread apart to enable insertion of a first cable between the arms, wherein the gripping members engage and grip the first cable, and wherein the locking projections are configured to be inserted into the aperture of the supporting structure. The cable hanger further comprises at least one finger attached to and extending from one of the arms or the base panel, the finger configured to deflect and grasp a second cable against the arm or base panel.

As a second aspect, embodiments of the invention are directed to a cable hanger for securing one or more cables to a supporting structure having an aperture, the cable hanger comprising: a base panel having opposed ends; a pair of arms, each of the arms attached to a respective end of the base panel and having a free end, the base panel and the arms defining a perimeter of the cable hanger; a pair of locking projections, each of the locking projections attached to a respective free end of the arms; and a pair of gripping members, each gripping member attached with a respective arm or to the base panel. The arms and locking projections are configured to spread apart to enable insertion of a first cable between the arms, wherein the gripping members engage and grip the first cable, and wherein the locking projections are configured to be inserted into the aperture of the supporting structure. The cable hanger further comprises a plurality of fingers attached to and extending from one of the arms or the base panel, the fingers configured to deflect and grasp a plurality of second cables against the arm or base panel. The base and arms define a perimeter of the cable hanger, and wherein the fingers are mounted and configured so that the second cables grasped by the fingers are located outside the perimeter of the cable hanger.

As a third aspect, embodiments of the invention are directed to a cable hanger for securing one or more cables to a supporting structure having an aperture. The cable hanger comprises: a base having opposed ends; a pair of arms, each of the arms attached to a respective end of the base and having a free end; a pair of locking projections, each of the locking projections attached to a respective free end of the arms; and a plurality of pairs of gripping members, each of the pairs of gripping members extending from one of the arms. The locking projections are configured to be inserted into the aperture of the supporting structure. Each of the pairs of gripping members is configured to engage and grip a respective cable.

As a fourth aspect, embodiments of the invention are directed to a cable hanger for securing one or more cables to a supporting structure having an aperture, wherein the cable hanger comprises: a base having opposed ends; a pair of arms, each of the arms attached to a respective end of the base and having a free end; a pair of locking projections, each of the locking projections attached to a respective free end of the arms; a first pair of gripping members extending from a first one of the arms; and a second pair of gripping members extending from a second one of the arms. Each of the pairs of gripping members is configured to engage and grip a respective cable.

DETAILED DESCRIPTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "attached", "connected" or "coupled" to another element, it can be directly connected or coupled to the other element or intervening elements may be present. In contrast, when an element is referred to as being "directly attached", "directly connected" or "directly coupled" to another element, there are no intervening elements present.

Figure 5:
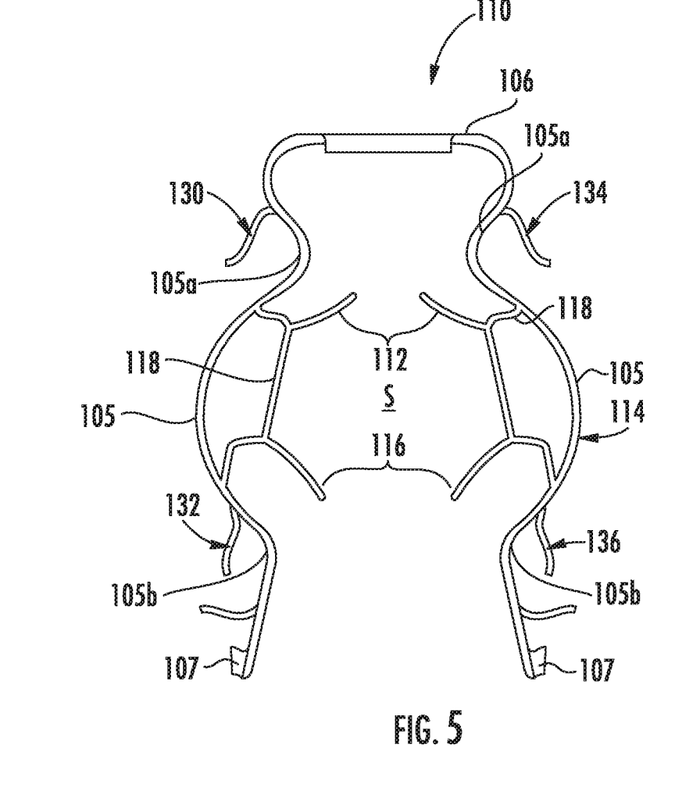
FIG. 5 is a top view of a cable hanger capable of mounting multiple cables according to embodiments of the invention.
Figure 6:
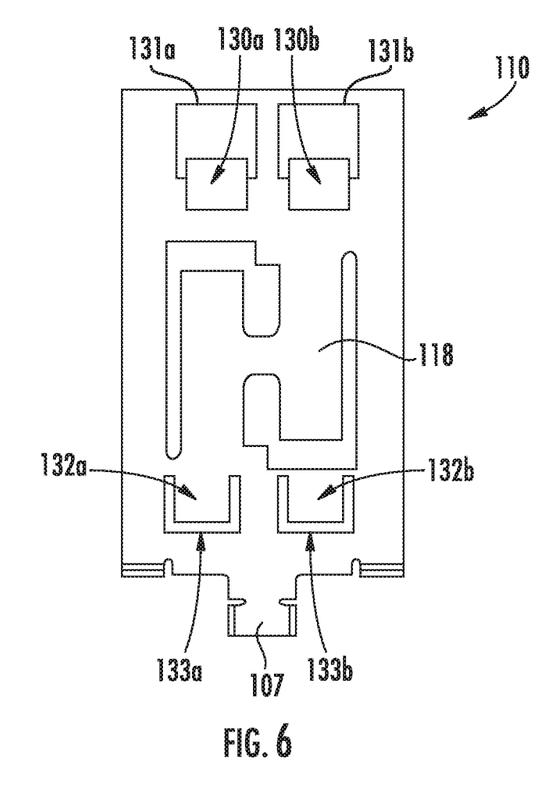
FIG. 6 is a side view of the cable hanger of FIG. 5.
Figure 7:
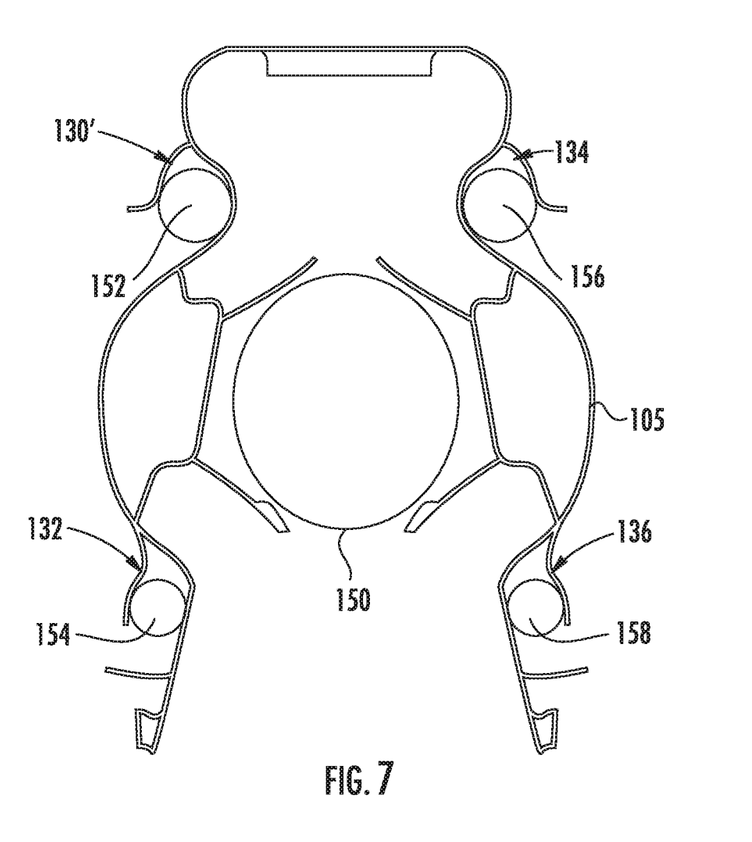
FIG. 7 is a top view of multiple cables mounted in the cable hanger of FIG. 5.

Referring now to the drawings, a cable hanger according to embodiments of the invention, designated broadly at 110, is shown in FIGS. 5-7. The cable hanger 110 is similar to the hanger 610 described above and includes a base 106, curved arms 105, locking projections 107, flex members 118 that define chords across the arcuate sections 114 of the arms 105, and cantilevered gripping members 112, 116 that extend from the flex members 118 and into the cable-gripping space S within the arms 105. However, the cable hanger 110 also includes four additional pairs of gripping fingers 130, 132, 134, 136 that are configured to provide gripping locations for additional cables. These are discussed in greater detail below.

As seen in FIG. 6, each pair of gripping fingers 130, 132, 134, 136 is positioned with one finger of the pair above the other finger of the pair (see fingers 130s, 130b, which make up pair 130, and fingers 132a, 132b, which make up pair 132, in FIG. 6). It can also be seen that each of the fingers 130a, 130b, 132a, 132b is adjacent a window 131a, 131b, 133a, 133b; in some embodiments, the fingers are bent from a metallic sheet, with the windows 131a, 131b, 133a, 133b representing the location on the sheet from which the fingers were bent. The fingers 130, 134 originate from locations on the arms 105 near the base 106, where they confront concave regions 105a of the arms 105. The fingers 132, 136 originate from locations on the arms 105 near the fixed ends of the flex members 118, where they confront concave regions 105b in the arms 105. The fingers 130, 132, 134, 136 are illustrated as being slightly arcuate, but may be of any appropriate shape.

As can be seen in FIG. 7, the presence of the fingers 130, 132, 134, 136 in the cable hanger 110 enables up to four additional cables 152, 154, 156, 158 to be mounted on the cable hanger 110 beyond the cable 150 that is grasped by the cantilevered gripping members 112, 116. Each of the fingers 130, 132, 134, 136 can deflect away from the arm 105 to receive a respective cable, then recover toward its resting position to grasp the cable. Notably, the fingers 130, 132, 134, 136 force their respective cables 152, 154, 156, 158 into the adjacent concave regions 105a, 105 of the arms 105.

In contrast to the cables mounted in prior cable hangers of this type, the additional cables 152, 154, 156, 158 are mounted outside or external to the perimeter of the hanger (i.e., outside of a perimeter defined by the base 106 and the arms 105). (As used herein, a mounting location is "internal" when it is located within the periphery of the cable hanger 110, and is "external" when it is located outside the periphery of the cable hanger 110). Also, these additional cables 152, 154, 156, 158 can be inserted into the fingers 130, 132, 134, 136 either before the cable hanger 110 and cable 150 are mounted to a mounting structure, or after such mounting occurs.

The ability of cable hanger 110 to receive and grasp additional cables can provide cost savings, as one hanger is needed where as many as five were necessary before. Additionally, lower wind loading can result, as multiple cables are held close to the tower (or other mounting structure), thus reducing any bending moment on the hanger that may result. The reduced wind loading may be particularly helpful if multiple hangers are stacked atop each other; for example, the mounting of ten cables with two stacked hangers would create far less wind load than the same ten cables mounted with ten stacked hangers.

In the illustrated embodiment, the fingers 130, 132, 134, 136 are sized to receive cables 152, 154, 156, 158 that are somewhat smaller than the cable 150 received by the gripping members 112, 116. This arrangement may be suitable for environments atop an antenna tower, where a thicker trunk cable (such as cable 150) is mounted adjacent a plurality of thinner jumper cables (such as cables 152, 154, 156, 158). As an example, a 1.5 inch trunk cable may be mounted in the gripping members 112, 116, and 0.6 inch jumper cables may be mounted in the fingers 130, 132, 134, 136.

Those skilled in this art will appreciate that other variations of the cable hanger 110 may also be suitable. For example, the number, size and locations of the fingers 130, 132, 134, 136 may vary: more or fewer fingers may be included; the fingers may be larger or smaller, or may vary in size within the same hanger; and the fingers may be mounted to different locations on the arms, to the base, adjacent the locking projections, or even within the perimeter of the hanger (e.g., near the base or the gripping members). Other variations are also contemplated.

It will also be appreciated that the base panel, arms, locking projections, flex members, and/or gripping members for the cable 150 may vary. For example, the flex members may lack gripping tabs, with the flex members themselves serving to engage the cable 150. Alternatively, the flex members may be mounted on the arms in a cantilevered manner, and configured either to freely deflect or to deflect in a limited manner until supported by a portion of the arm or another structure. The arms 106 are illustrated as being arcuate, but may instead include one or more straight sections. These and other variations are discussed in U.S. Patent Publication No. 2016/0281881 to Vaccaro, supra, which is incorporated by reference above.

Also, the fingers and/or gripping tabs may include features (including ridges, edges, barbs, and the like) that enhance gripping of a cable, facilitate insertion of a cable, or both. Examples of such features are described in co-assigned and co-pending U.S. patent application Ser. No. 15/335,614, filed Oct. 27, 2016, the disclosure of which is hereby incorporated herein in its entirety.

Those skilled in this art will appreciate that the cable hangers discussed above are typically formed of a metallic material, such as steel, and may be formed as a unitary member (often from a flat blank stamped from sheet steel and bent into a desired shape).

Also, as discussed above, the cable hanger 110 can be arranged in a "stacked" relationship by inserting the locking projections of one cable hanger into the mounting hole in the base of a second cable hanger in the manner described above with respect to cable hanger 10. The second cable hanger may be identical to or different from the first cable hanger as needed for hanging the cable in question.

Figure 8:
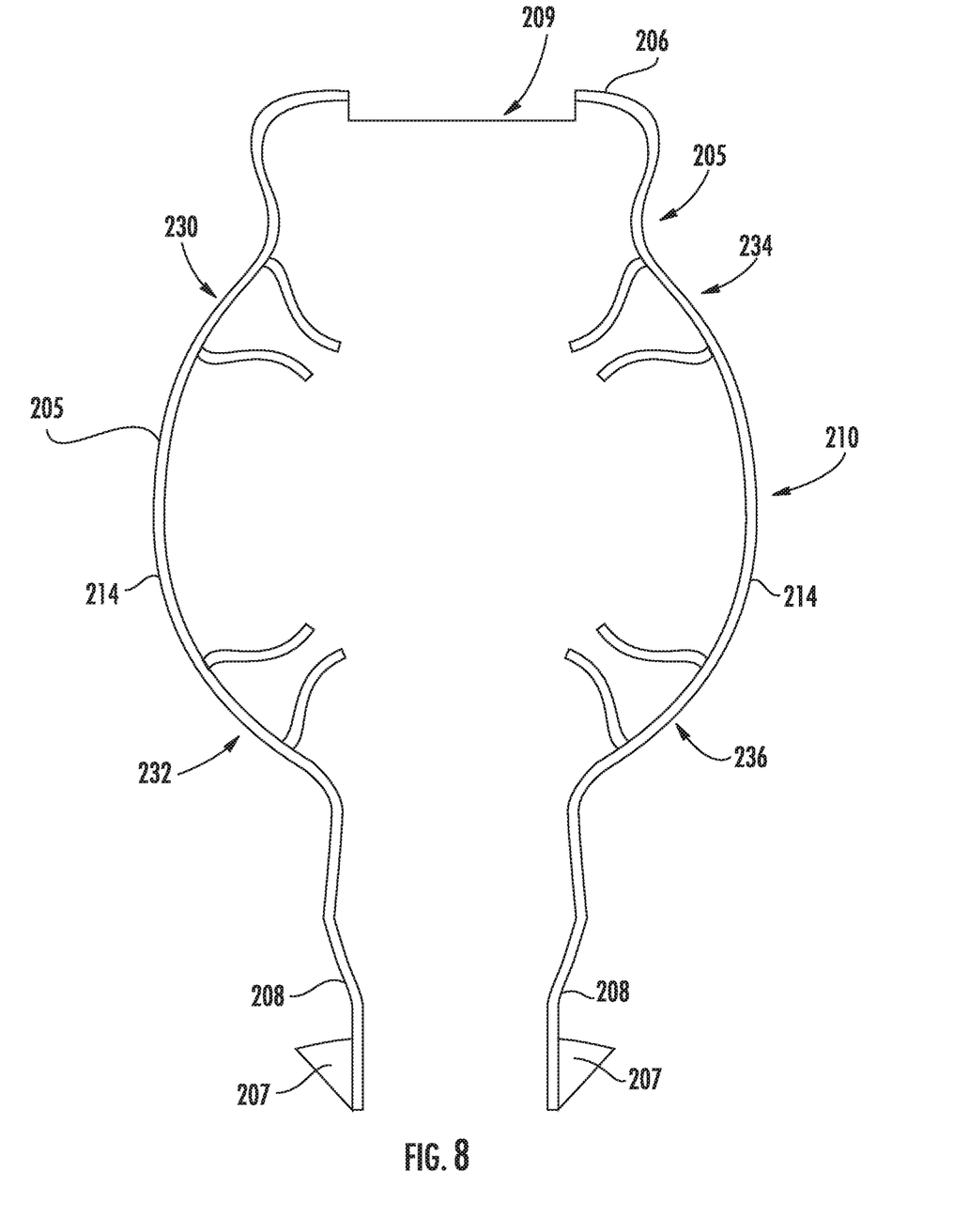
FIG. 8 is a top view of a cable hanger capable of mounting multiple cables according to further embodiments of the invention.

Referring now to the drawings, a cable hanger 210 according to embodiments of the invention is shown in FIG. 8. The cable hanger 210 is similar in configuration to the cable hanger 10 above and has a base 206 with a mounting hole 209, curved arms 205 with arcuate portions 214 and locking segments 208, and locking projections 207 extending from the locking segments 208. However, rather than having gripping tabs configured to grip a single cable like those of the cable hanger 10, the cable hanger 210 includes four additional pairs of gripping fingers 230, 232, 234, 336 that are configured to provide gripping locations for additional cables. These are discussed in greater detail below.

As can be seen in FIG. 8, the pair of gripping fingers 230 extends from one end of the arcuate portion 214 of one of the arms 205 relatively near the base 206, with another pair of gripping fingers 232 extending from the opposite end of the arcuate portion 214 near the corresponding locking segment 208. The gripping fingers 234 extend from the "base" end of the arcuate portion 214 of the other arm 205, and the gripping fingers 236 extend from the "locking segment" end of the arcuate portion 214 of the other arm 205. The gripping fingers 230, 232, 234, 236 provide internal mounting locations for the cable hanger 210. (As note above, as used herein, a mounting location is "internal" when it is located within the periphery of the cable hanger 210, and is "external" when it is located outside the periphery of the cable hanger 210).

Figure 9:
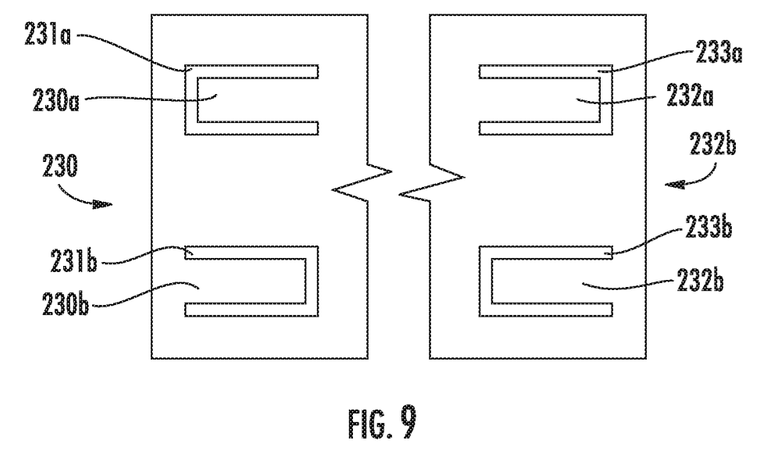
FIG. 9 is an enlarged side view of two pairs of gripping fingers of the cable hanger of FIG. 8 prior to being bent into the clip configuration shown therein.

As seen in FIG. 9, each pair of gripping fingers 230, 232, 234, 236 is positioned with one finger of the pair being vertically offset above the other finger of the pair (see fingers 2302, 230b, which make up pair 230, and fingers 232, 232b, which make up pair 232, in FIG. 9). It can also be seen that each of the fingers 230a, 230b, 232a, 232b is adjacent a window 231a, 231b, 233a, 233b; in some embodiments, the fingers are bent from a metallic sheet, with the windows 231a, 231b, 233a, 233b representing the location on the sheet from which the fingers are bent. (FIG. 9 illustrates the fingers 230a, 230b, 232a, 232b prior to being bent.)

Figure 10A:
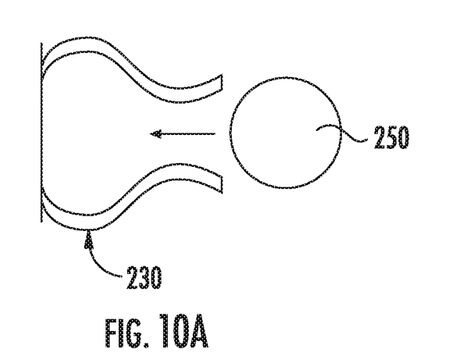
FIGS. 10A and 10B are top views of a pair of gripping fingers of the cable hanger of FIG. 8 receiving a cable for mounting.
Figure 10B:
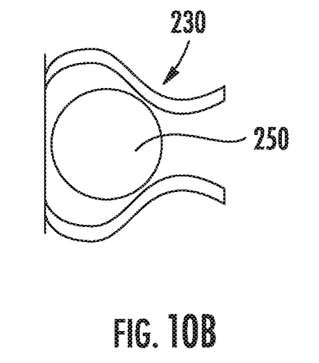

A cable may be mounted between any of the pairs of gripping fingers (FIGS. 10A and 10B show a cable 250 mounted in fingers 230). Thus, the single cable hanger 210 can mount as many as four cables in the gripping fingers 230, 232, 234, 236. Typically, cables 250 will be sized between 4 and 17 mm in diameter, although the fingers 230, 232, 234, 236 may be configured to receive cables of any suitable size.

Once cables 250 are mounted in the fingers 230, 232, 234, 236, the cable hanger 210 can be mounted to a mounting structure via the locking projections 207 being deflected toward each other from a relaxed state and being inserted into a hole (typically ¾ inch) in a mounting structure in the deflected condition. The locking segments 208 exert outward pressure on edges of the hole, and the locking projections 207 maintain the cable hanger 210 in a mounted position on the mounting structure.

Figure 11:
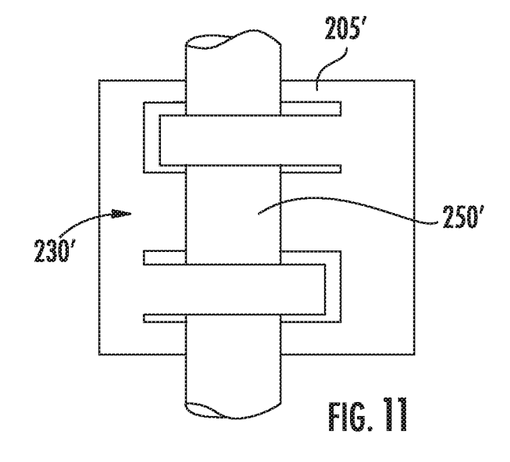
FIG. 11 is a side view of a pair of gripping fingers for a cable hanger according to alternative embodiments of the invention.

The gripping fingers 230, 232, 234, 236 are illustrated as being curvilinear, with their free end portions nearer than their fixed ends (thereby forming an open-ended "clip") but may be of any appropriate shape for mounting cable. For example, as can be seen in FIG. 11, a pair of fingers 230' may also be configured such that their free ends overlap each other, with the result that the fingers 230' tend to press a cable 250' against the arm 205' rather than tending to compress the cable between the fingers in the fashion of a clip.

Those skilled in this art will appreciate that other variations of the cable hanger 210 may also be suitable. For example, the number, size and locations of the pairs of fingers 230, 232, 234, 236 may vary: more or fewer fingers may be included; the fingers may be larger or smaller, or may vary in size within the same hanger; and the fingers may be mounted to different locations on the arms, to the base, or adjacent the locking projections. The pairs of gripping fingers may be mounted to one or both of the arms 205. Other variations are also contemplated.

It will also be appreciated that the base panel 206, arms 205, and locking projections 207 for the cable hanger 210 may vary. For example, the arms 205 are illustrated as being arcuate, but may instead include one or more straight sections. The locking segments 208 of the arms 205 may be straight, curved, or a combination of both. These and other variations are discussed in U.S. Patent Publication No. 2016/0281881 to Vaccaro, supra, which is incorporated by reference above.

Also, the gripping fingers 230, 232, 234, 236 may include features (including ridges, edges, lances, barbs, nubs, dimples and the like) that enhance gripping of a cable, facilitate insertion of a cable, or both. Examples of such features are described in co-assigned and co-pending U.S. patent application Ser. No. 15/335,614, filed Oct. 27, 2016, the disclosure of which is hereby incorporated herein in its entirety.

Those skilled in this art will appreciate that the cable hangers 210 discussed above are typically formed of a metallic material, such as steel, and may be formed as a monolithic member (often from a flat blank stamped from sheet steel and bent into a desired shape).

Also, as discussed above, the cable hanger 210 can be arranged in a "stacked" relationship by inserting the locking projections of one cable hanger 210 into the mounting hole 209 in the base 206 of a second cable hanger 210 in the manner described above with respect to cable hanger 10. The second cable hanger may be identical to or different from the first cable hanger as needed for hanging the cable(s) in question.

Figure 12:
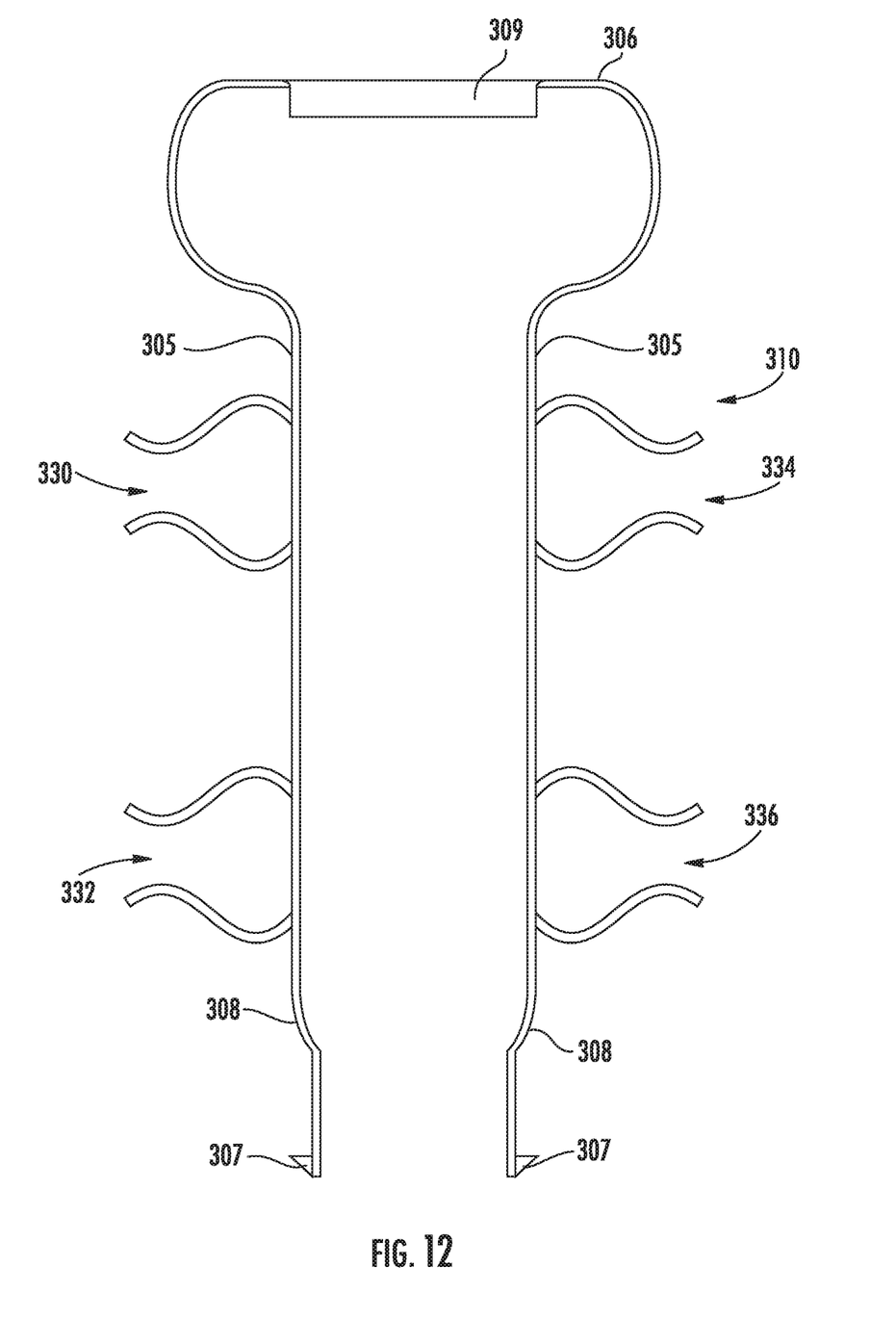
FIG. 12 is a top view of a cable hanger capable of mounting multiple cables according to alternative embodiments of the invention.

Referring now to FIG. 12, another cable hanger, designated broadly at 310, is shown therein. The cable hanger 310 has a base 306, arms 305, locking segments 308 and locking projections 307. However, the arms 305 are relatively straight, such that relatively little space exists between the arms 305. Pairs of gripping fingers 330, 332 extend laterally from one of the arms 305, and pairs of gripping fingers 334, 336 extend laterally in the opposite direction from the other of the arms 305. Thus, the single cable hanger 305 can provide four mounting locations for cables, each of which is external to the periphery of the cable hanger 305.

Like the cable hanger 210, the cable hanger 310 can be mounted on a mounting structure by inserting the locking projections through a mounting hole (typically nominally ⅝ inch in size). The base 306 includes a hole 309 that can accept the locking projections of another cable hanger, which may be of the same configuration or may differ.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A cable hanger, comprising:
   a base having a first stacking feature;
   first and second arms, each of the arms attached to a respective opposite edge of the base and extending generally perpendicularly to the base;
   the base, the first arm and the second arm defining a periphery;
   second stacking features attached to the first and second arms, the second stacking features configured to mate with the first stacking features to enable an identical second cable hanger to stack on the cable hanger;
   at least one first cable gripping member connected with and extending from the first arm external to the periphery in a first direction generally perpendicular to the first arm;
   at least one second cable gripping member connected with and extending from the second am external to the periphery in a second direction that is opposite the first direction;
   a third cable gripping member mounted on and extending from the first arm within the periphery; and
   a fourth cable gripping member mounted on and extending from the second arm within the periphery;
   wherein the third and fourth cable gripping members are sized and configured to together grip a cable within the periphery.

2. The cable hanger defined in claim 1, wherein the base includes a hole.

3. The cable hanger defined in claim 1, wherein the at least one first cable gripping member is a plurality of first cable gripping members.

4. The cable hanger defined in claim 3, wherein the at least one second cable gripping member is a plurality of second cable gripping members.

5. The cable hanger defined in claim 1, wherein the base, first and second arms, and first, second, third and fourth gripping members are formed as a unitary device.

6. The cable hanger assembly defined in claim 1, in combination with at least one cable mounted in one of the first or second gripping members.

7. A cable hanger, comprising:
   a base having a first stacking feature;

first and second arms, each of the arms attached to a respective opposite edge of the base and extending generally perpendicularly to the base;

the base, the first arm and the second arm defining a periphery;

second stacking features attached to the first and second arms, the second stacking features configured to mate with the first stacking features to enable an identical second cable hanger to stack on the cable hanger;

at least two first cable gripping structures connected with and extending from the first arm external to the periphery in a first direction generally perpendicular to the first arm, each of the first cable gripping structures configured to grasp a respective first cable; and at least two second cable gripping structures connected with and extending from the second arm external to the periphery in a second direction that is opposite the first direction, each of the second cable gripping structures configured to grasp a respective second cable;

wherein the base, first and second arms, and first and second gripping structures are formed as a unitary device.

8. The cable hanger defined in claim 7, wherein each of the first cable gripping structures comprises two first cable gripping members.

9. The cable hanger defined in claim 8, wherein each of the second cable gripping structures comprises two second cable gripping members.

10. The cable hanger assembly defined in claim 7, in combination with at least one cable mounted in one of the first or second gripping structures.

* * * * *

UNITED STATES PATENT AND TRADEMARK OFFICE
CERTIFICATE OF CORRECTION

PATENT NO. : 11,536,398 B2
APPLICATION NO. : 17/082656
DATED : December 27, 2022
INVENTOR(S) : Vaccaro et al.

It is certified that error appears in the above-identified patent and that said Letters Patent is hereby corrected as shown below:

In the Claims

Column 8, Line 42, Claim 1: Please correct "am" to read --arm--

Signed and Sealed this
Twenty-first Day of March, 2023

*Katherine Kelly Vidal*

Katherine Kelly Vidal
*Director of the United States Patent and Trademark Office*